(12) United States Patent
Sasaki et al.

(10) Patent No.: US 10,040,268 B2
(45) Date of Patent: Aug. 7, 2018

(54) ANTI-SLIP SHEET TO BE USED AROUND WATER

(71) Applicant: 3M INNOVATIVE PROPERTIES COMPANY, St. Paul, MN (US)

(72) Inventors: Makoto Sasaki, Mishima (JP); Harunobu Sato, Tokyo (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/904,851

(22) PCT Filed: Jul. 29, 2014

(86) PCT No.: PCT/US2014/048544
§ 371 (c)(1),
(2) Date: Jan. 13, 2016

(87) PCT Pub. No.: WO2015/017371
PCT Pub. Date: Feb. 5, 2015

(65) Prior Publication Data
US 2016/0167335 A1    Jun. 16, 2016

(30) Foreign Application Priority Data

Jul. 31, 2013 (JP) ................................. 2013-158867

(51) Int. Cl.
*B32B 3/30* (2006.01)
*B32B 27/08* (2006.01)
(Continued)

(52) U.S. Cl.
CPC ............ *B32B 3/30* (2013.01); *A47G 27/0225* (2013.01); *B32B 27/08* (2013.01); *B32B 27/36* (2013.01);
(Continued)

(58) Field of Classification Search
None
See application file for complete search history.

(56) References Cited

U.S. PATENT DOCUMENTS 3,895,153 A * 7/1975 Johnston ............... B29C 59/025
156/209
6,077,472 A * 6/2000 Kataoka .............. B29C 45/0025
264/219
(Continued)

FOREIGN PATENT DOCUMENTS

JP    7-158244      6/1995
JP    08-127060 A2  5/1996
(Continued)

OTHER PUBLICATIONS

EP Search Report, EP 14831234.1, dated Feb. 21, 2017, 6 pages.

*Primary Examiner* — David Sample
*Assistant Examiner* — Donald M Flores, Jr.
(74) *Attorney, Agent, or Firm* — Emily V. Hargett (57) ABSTRACT

An anti-slip sheet to be used around water can be easily fixed onto the floor or bathtubs, etc., by simply adhering. The sheet resists curling (coiling) or separation, has low surface irritation on skin, and even under humid environment has excellent anti-slip properties. The anti-slip sheet includes a resin film having a Shore A hardness of 60 or higher and 82 or lower, a protrusion and indentation surface where the maximum value of the adjacent protrusions peaks are within the range of 10 microns or higher and 150 microns or lower, has a maximum height Rmax of the surface roughness within the range of 15 microns or higher and 90 microns or lower, and includes a top part reinforcing film positioned on the resin film on the side opposite to the protrusions and indentations containing surface which is harder than the resin film, and includes a bottom part adhesive layer positioned on the side of the top part reinforcing film that is opposite to the resin film.

12 Claims, 6 Drawing Sheets

(51) Int. Cl.
*B32B 27/36* (2006.01)
*B32B 27/40* (2006.01)
*A47G 27/02* (2006.01)

(52) U.S. Cl.
CPC ........ *B32B 27/40* (2013.01); *B32B 2307/744* (2013.01); *B32B 2471/04* (2013.01)

(56) References Cited

U.S. PATENT DOCUMENTS

| | | |
|---|---|---|
| 6,132,844 A | 10/2000 | Altshuler |
| 6,610,382 B1 * | 8/2003 | Kobe .................... A63B 49/08 128/849 |
| 2004/0192130 A1 | 9/2004 | Baciu |
| 2004/0224113 A1 | 11/2004 | Haas |
| 2007/0148409 A1 | 6/2007 | Rios |
| 2009/0162651 A1 | 6/2009 | Rios et al. |

FOREIGN PATENT DOCUMENTS

| | | |
|---|---|---|
| JP | 10-183059 | 7/1998 |
| JP | 2002-326243 A2 | 11/2002 |
| JP | 3508761 | 3/2004 |
| JP | 2007-154491 A2 | 6/2007 |
| JP | 4060689 | 3/2008 |
| JP | 2010-261227 | 11/2010 |
| JP | 2012-067506 A2 | 4/2012 |
| JP | 2013-022748 | 2/2013 |
| KR | 20-0255373 | 12/2001 |

* cited by examiner

ANTI-SLIP SHEET TO BE USED AROUND WATER

CROSS REFERENCE TO RELATED APPLICATIONS

This application is a national stage filing under 35 U.S.C. 371 of PCT/US2014/048544, filed 29 Jul. 2014, which claims priority to JP Patent Application No. 2013-158867, filed 31 Jul. 2013, the disclosures of which are incorporated by reference in their entirety herein.

FIELD

The present invention relates generally to an anti-slip sheet to be used around water that can be used to prevent slipping on wet surfaces.

BACKGROUND

In a bath, at poolside, or at other locations around water, or in a humid environment, a floor surface may become slippery. Because wet floor surfaces may become slippery, various anti-slip treatments may be used to prevent slipping. Anti-slipping treatments may, for example, impart waviness or surface texture in the form of, for example, protrusions and indentations to the floor surface by coating a material in which sand, etc., has been incorporated, or the floor surface may be covered by using a matt, etc., which has protrusions and indentations.

Japanese Patent Application Laid Open Number Hei-Sei 7-158244 discloses a method where indentations and protrusions are imparted on the surface of a concrete floor by a coating process using a waterproof coating material. Japanese Patent Application Laid Open Number 2010-261227 discloses a sheet used for floor adhesion where protrusions and indentations containing a hard coat layer has been provided on the transparent urethane resin sheet. Japanese Patent Number 3508761 discloses a floor panel that may be used in bathrooms wherein in the space between the protrusions, water is temporarily held and through water escape flow through grooves it is allowed to escape without interruption. Japanese Patent Number 4060689, discloses a floor material that may be used in bathrooms that includes coating an organic coating material where through the presence of fine particles formed from hydrophilic inorganic material, the contact angle is set to be within the range of 40 to 70 degrees, the water brushing properties are improved.

SUMMARY

The need exists for improved anti-slip sheets for wet surfaces. In the case of the previous technology wherein anti-slip materials are adhered to the floor, it is easy to generate distortion or separation and together with that at the time when the floor surface that has protrusions and indentations comes in contact with a person's skin, there are cases where pain or discomfort is felt on the feet or body. It would be desirable to provide an anti-slip sheet that reduces or eliminates this discomfort.

The present invention provides an anti-slip sheet to be used around water that can be easily fixed onto floor surfaces or bathtubs, etc., by simply adhering, and it is resistant to coiling or separation, the surface irritation for skin is low, and even under humid environmental conditions excellent anti-slip results can be obtained.

In order to overcome the above described limitations in the field, as the first condition of the present invention, the anti-slip sheet to be used around water is suggested which has a resin film that has a Shore A hardness that is 60 or higher and 82 or lower and that has a protrusion and indentation surface where the maximum value of the adjacent protrusions peaks within the range of 10 microns or higher and 150 microns or lower, and also, which has a maximum height Rmax of the surface roughness is within the range of 15 microns or higher and 90 microns or lower, a first reinforcing film positioned on the resin film on the side opposite to the protrusions and indentations containing surface, wherein the reinforcing film is harder than the resin film, and an adhesive agent layer positioned on the side of the first reinforcing film that is opposite to the resin film. In this manner, the present invention provides an anti-slip sheet to be used around water that can be easily fixed onto the floor or bathtubs, etc., by simply adhering, and it is difficult to generate coiling or separation, wherein the surface irritation on skin is low and where even under humid environmental conditions excellent anti-slip results can be obtained.

DETAILED DESCRIPTION

In one embodiment, the present invention provides an the anti-slip sheet to be used around water which has a resin film having a Shore A hardness that is 60 or higher and 82 or lower and that has a protrusion and indentation surface where the maximum value of the adjacent protrusions peaks within the range of 10 microns or higher and 150 microns or lower, and also, which has a maximum height (Rmax) of the surface roughness within the range of 15 microns or higher and 90 microns or lower, a first reinforcing film positioned on the resin film on the side opposite to the protrusions and indentations containing surface, wherein the first reinforcing film is harder than the resin film, and an adhesive agent layer positioned on the side of the first reinforcing film that is opposite to the resin film.

In one embodiment, the first reinforcing film may be positioned between the resin film and the adhesive agent layer. The first reinforcing film may also be directly bonded to the resin film. In addition, there may be one or more layers in the space between the resin film and the first reinforcing film.

Regarding the term "around water", which is used in the detailed description of the present invention, it includes facilities and equipment that are likely to come in human contact under the humid environment in real life. More specifically, as used in the present invention description, the term "around water" includes, for example, bathrooms, bathtubs, dressing rooms, washrooms, clothes and tableware washing areas (e.g., around sinks), cleaning sites and poolside locations, and floors, walls, or handrails, etc., of facilities that become under humid environment for people when raining (shops, offices, factories, public facilities, etc.).

The above described "maximum height" (Rmax) of the surface roughness is a value that is obtained by the standard measurement of the surface roughness according to the JIS B 0601. Especially, the term "Shore A hardness" in the above described is a value obtained by measurement according to the JIS K 6253 type A durometer.

The term "adjacent protrusion parts peak distance" is the distance between the peaks of the adjacent protruded parts within the protrusion and indentation containing surface. Here, the protruded parts referenced in the description of the present invention have the meaning of protruded parts formed intentionally by, for example, lamination transfer and the like. The intentionally formed protruded parts have a size that can be confirmed by using a non-contact surface roughness measurement device, such as the NewView 6000 device manufactured by Zygo), by using 20× magnification. For example, as the protrusions and indentations that can be confirmed at this magnification, protrusions are contained where when the height is 5.0 microns or above, the adjacent distance is at least 1.0 microns or higher. Regarding the adjacency direction of the protruded parts, it is not limited to one direction and it includes any direction within the protrusion and indentation containing surface.

The "maximum value of the adjacent protrusion parts peak distance" is a value that has a significant effect on the softness, the slipperiness, the lowering of the skin irritation and the anti-slip results.

There are no particular limitations regarding the size and the planar shape of the anti-slip sheet according to the practical implementation of the present invention. Regarding the planar shape, depending on the application, it is not limited to a band shape, and it is also possible to use rectangular, or other polygon shapes, circular, elliptical, irregular, stacked, etc., shapes.

Referring now to the drawings, certain embodiments and certain specific aspects the present invention will be explained in detail by using the figures as illustrations, however, the present invention is by no means limited to the below described embodiments, and it must be understood that persons skilled in the industry based on general knowledge may change the design parameters or add improvements as long as it is within a range without departing from the spirit of the present invention.

Figure 1:
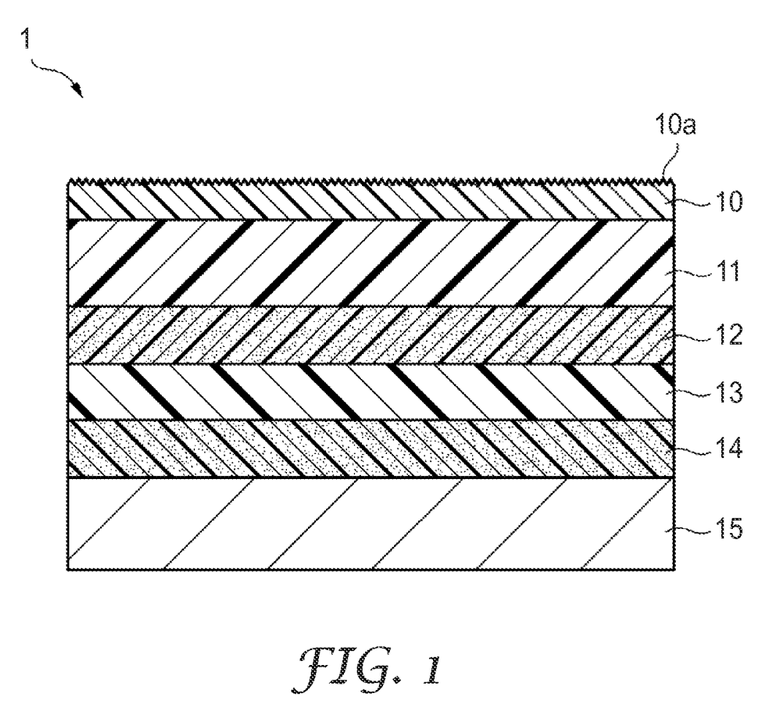
FIG. 1 is a cross sectional view showing one embodiment of the anti-slip sheet to be used around water according to the present invention.

FIG. 1 is a cross-sectional view showing one embodiment of the anti-slip sheet to be used around water according to the present invention. As shown in FIG. 1, the anti-slip sheet 1 be used around water has a structure formed as a laminated layer material where the resin film 10, the upper part reinforcing film 11, the upper part adhesive agent layer 12, the bottom part reinforcing layer 13, the bottom part adhesive agent layer 14 and the liner 15 are layer laminated in this order.

The resin film 10 forms the structure of the front surface of the anti-slip sheet to be used around water 1, and on its whole front surface the protrusion and indentation containing surface 10a has been formed. Moreover, it is also a good option if the protrusion and indentation containing surface 10a is formed on one part of the front surface of the resin film 10. Regarding the protrusion and indentation containing surface 10a, it is preferred to be a surface that has at least 10 microns or higher as the maximum value of the adjacent protruded part peak distance. Regarding the maximum value of the adjacent protruded part peak distance, it is also a good option if it is at least 15 microns or higher, and it is a good option if it is at least 50 microns or higher. Regarding the maximum value of the adjacent protruded part peak distance, it is preferred that it be 150 microns or less. It is a good option if the maximum value of the adjacent protruded part peak distance is 100 microns or less, and it is also a good option if it is 80 microns or less.

The adjacent protruded part peak distance is the distance between the peaks of the protruded parts that are adjacent within the protrusion and indentation containing surface 10a. The maximum value of the adjacent protruded part peak distance is a value that has a significant effect on the softness, the slipperiness, the lowering of the skin irritation and the anti-slip results.

In one embodiment, the protrusion and indentation containing surface 10a has a maximum height Rmax of the surface roughness of at least 15 microns or higher. Regarding the maximum height Rmax, in one embodiment it may be at least 20 microns or higher, and in another embodiment if may be at least 50 microns or higher. The maximum height Rmax may be 90 microns or less, 80 microns or less, or 60 microns or less. The maximum height Rmax in the surface roughness is a value measured according to the standards of the JIS B 0601.

By having the "adjacent protruded parts peak distance" and the "surface roughness maximum height Rmax" of the protrusion and indentation containing surface 10a be within the above described ranges, it is possible to provide an anti-slip sheet 1 to be used around water which imparts minimal discomfort upon foot or body contact, and the front surface is smooth and soft and therefore has an excellent anti-slip effect even relative to water. If the adjacent protruded parts peak distance is not at least 10 microns or higher, it becomes difficult to obtain the anti-slip effect, and if the adjacent protruded parts peak distance exceeds 150 microns, it becomes easy to have an uncomfortable or painful feeling on the skin. In addition, if the surface roughness maximum height Rmax is lower than 15 microns, the anti-slip result at the time of wetting by water becomes insufficient, and also, if the maximum height Rmax is higher than 90 microns, there is the danger that a feeling of discomfort or pain on the skin can be generated. Because the maximum height Rmax is 90 microns or less, the indentation and protrusion containing surface 10a is unusually smooth and the problem of dirt being held (residing) in the indented parts is also small, and this is also effective from a hygiene standpoint. Moreover, optionally (depending on the requirements) an antibacterial agent may be added into the resin.

In one embodiment, the resin film 10 has a Shore A hardness of at least 60 or higher or at least 70 or higher. In another embodiment, the resin film 10 may have a Shore A hardness of 82 or less, or 75 or less. If the Shore A hardness of the resin film 10 is higher than 82, the anti-slip results and the softness relative to the skin are insufficient, and if the Shore A hardness is less than 60, the formation of the sticky film becomes difficult, and dust can easily adhere.

For the resin that forms the structure of the resin film 10, it is possible to use elastomeric materials. For the elastomers, it is possible to use urethane elastomers, olefin elastomers, natural rubber, synthetic rubber, etc with urethane elastomers being particularly desirable. Also, for the formation of the protrusion and indentation containing surface 10a, a material possessing thermo-plastic properties, such as, soft urethane elastomer (TPU), may be used. As the elastomers, especially, polyether type thermo-plastic urethane elastomers or polyester type thermo-plastic type urethane elastomers are preferred; and from the standpoint of the hydrolysis resistance performance, the polyether type thermo-plastic urethane elastomers are preferred. Also, as the resin forming the structure of the resin film 10, soft polyvinyl chloride may be used. Regarding the resin film 10, it is also possible to contain additive agents such as cross-linking agents, surface improvement agents, curing agents, surface active agents, hard beads, flame retardation imparting agents, oxidation stabilization agents, adhesion imparting resins, coloring agents, antibacterial agents, etc. In FIG. 1, an example is shown where the resin film 10 is Soft Micro-Structured TPU (soft thermo-plastic polyurethane with a fine structure). Also, regarding the thickness of the resin film 10, it can be made to be within the range of 10 microns to 100 microns such as, for example 30 microns.

Regarding the above described reinforcing film 11, it is a film that is harder than the resin film 10 and can be used in order to increase the hardness of the anti-slip sheet 1 to be used around water. The above described reinforcing film 11 can be placed, for example, on the side of the resin film 10 that is opposite to the protrusion and indentation containing surface 10a (the back side).

Regarding the reinforcing film 11, it is preferred that it has a Shore A hardness of 90 or higher. In one embodiment, the upper part reinforcing film 11 has a Shore A hardness of 100 or less. In one embodiment, the thickness of the upper part reinforcing film 11 is within the range of 50 microns to 140 microns. In a specific embodiment, the upper part reinforcing film 11 has a thickness of 120 microns.

As the material forming the structure of the above described reinforcing film 11, it is possible to use, for example, polyesters, and it is preferred that these be hard materials. Suitable elastomers, include urethane elastomers, olefin elastomers, natural rubbers, synthetic rubbers, etc. Suitable materials forming the structure of the upper part reinforcing film 11 include polyethylene terephthalate (PET), polyethylene naphthalate (PENO, syndiotactic polystyrene (SPS), polyphenylene sulfide (PPS), polycarbonate (PC), polyarylate (Par), polysulfon (PSF), polyester sulfon (PES), polyether imide (PEI), transparent polyimide (PI), etc. In FIG. 1, an example is shown where the upper part reinforcing film 11 is formed from Hard TPU (hard thermo-plastic urethane). In this embodiment, the resin film 10 and the upper part reinforcing film 11 can be formed as one body by using the co-extrusion method. In the case of the laminated layer material formed as one body by co-extrusion, it is possible to form laminated layers that are difficult to separate without using an adhesive layer. The manufacturing method for the preparation of the anti-slip sheet 1 using the co-extrusion method is according to the described here below.

The bottom part reinforcing film 13 is used in order to increase the hardness of the anti-slip sheet 1, and it is a film that is harder than the resin film 10. The bottom part reinforcing film 13 can be placed in the space between the upper part reinforcing film 11 and the bottom part adhesive agent layer 14. The bottom part reinforcing film 13 can be formed as one surface adhered to the top part reinforcing film 11 via the upper part adhesive agent layer 12, and on the other surface the bottom part adhesive agent layer 14 is formed. In this embodiment, the bottom part reinforcing film 13 corresponds to the substrate of the double-sided sticky tape and the upper part adhesive agent layer 12 and the bottom part adhesive agent layer 14 correspond to the adhesive agent layers on both sides of the double-sided adhesive tape.

As the bottom part reinforcing film 13, it is possible to use the same materials as those used for the top part reinforcing film 11, however, it is also possible to use polyethylene terephthalate (PET), or aluminum foil, etc., thin plate metals.

In the case when PET or thin plate metals are used as the bottom part reinforcing film 13, it is preferred that the Shore HAS hardness be at least 30 or higher, at least 40 or higher, or at least 60 or higher. For the bottom part reinforcing film 13, it is preferred that the Shore HAS hardness is 97 or lower. The Shore HAS is measured according to the standards of the JIS B 7727. In one embodiment, the bottom part reinforcing film 13 uses a material that is harder than that used for the top part reinforcing film 11. In one embodiment, the thickness of the bottom part reinforcing layer 13 is within the range of 25 microns to 200 microns, and may be, for example, about 50 microns.

The bottom adhesive layer 14 is a layer for fixing the anti-slip sheet 1 to, for example, a floor surface. Before the use of the tape, the surface of the bottom part adhesive layer 14 is covered by the liner 15. The bottom layer adhesive may be, for example, natural rubber adhesives, synthetic rubber (SBR, SIS, etc.) adhesives, silicone adhesives, acrylic adhesives, polyethylene resins containing adhesive, etc. For the bottom part adhesive layer 14, it is preferred to be a layer that has repeat release properties with a strong adhesion, and it is preferred to be a layer that contains crosslinked acrylic type adhesive agent (crosslinked acrylic type adhesive agent). The crosslinking is achieved as an acrylic type adhesive containing functional radicals like hydroxylic radicals, carboxylic radicals, amino radicals, epoxy radicals, etc., and a crosslinking agent containing functional radicals that can react with these functional radicals, are reacted. Also, it is possible to achieve the crosslinking by using monomers containing two or more ethylenic type unsaturated radicals. As such crosslinked acrylic type adhesives it is possible to list the adhesives obtained by the reaction between the acrylic type adhesives where butyl acrylate (BA), acrylic acid (AA) and vinyl acetate (Vac) have been copolymerized at a weight ratios in the range of 90~95:3~6:2~4 (this is the case as represented by "BA/AA/Vac=90~95/3~6:2~4"), and the crosslinking agent that has reactive properties relative to the carboxylic radical contained in the above adhesive (polyisocyanates etc., isocyanate crosslinking agents). The thickness of the bottom layer adhesive layer 14 is within the range of 10 microns to 50 microns and may be, for example, 25 microns.

The liner 15 is a release liner, which covers the front surface of the bottom part adhesive layer 14 prior to the use of the tape. Suitable liners 15 include, for example, a poly slick liner whose front surface has been coated with polyethylene. In addition, the liner 15 may be formed on a paper release coating like silicone coating etc. At the time of the use of the anti-slip sheet 1, the liner 15 is removed from the bottom part adhesive layer 14 and the exposed front surface of the bottom part adhesive layer 15 is adhered to the floor surface, whereby the sheet is fixed. The liner 15 is not an essential structural component of the anti-slip sheet 1, and may, therefore be omitted.

Regarding the thickness of the anti-slip sheet 1 that has the structure described herein, it generally has a thickness of less than about 500 microns, or less than about 200 microns. In addition, the anti-slip sheet 1 may have a thickness of at least 100 microns or more. By making the anti-slip sheet 1 thin, it is possible to make the step change of the floor with the adhered material small. Thus, it is possible to prevent the step change of the floor with the adhered anti-slip sheet 1 be the cause for catching a person's foot, or be the cause of generating a feeling of excess pain at the time of contact with the skin.

The following is an explanation regarding the manufacturing method for the preparation of the anti-slip sheet 1 to be used around water according to at least one of the embodiments described above.

According to one manufacturing method for the preparation of the anti-slip sheet 1 according to the embodiments described herein, first, through a co-extrusion method using T die, a film is formed as thermo-plastic urethane elastomer resins with Shore A hardness values of 80 and 90 are formed as one body. The Shore hardness A 80 resin corresponds to the resin film 10. The Shore hardness A 90 resin corresponds to the top part reinforcing film 11. The Shore hardness A 80 and 90 resins, correspondingly have thicknesses that are in the range of 10 microns to 100 microns and 50 microns to 140 microns, whereby the corresponding thicknesses become 30 microns and 120 microns.

Next, protrusions and indentations are formed on the front surface of the resin layer corresponding to the resin film 10. More specifically, on the surface of the resin after it has been extruded through the T die and while the temperature is held at or above the softening point temperature, engineering paper is laminated, on which protrusions and indentations have been formed through, for example, a sand blast process, and by that the protrusions and indentations of the engineering paper are transferred (copied) onto the resin front surface and the protrusion and indentation surface 10a is formed. In addition, on the front surface of the top part reinforcing film 11 (the surface on the side opposite to the resin film 10), an adhesion facilitating treatment, such as corona treatment, may be provided.

Next, relative to the front surface of the above described top part reinforcing film 11, which has been subjected to the adhesion facilitating treatment, a double-sided tape, which has been coated on both surfaces with an adhesive agent, is adhered and by that the anti-slip sheet 1 has been manufactured. The base material of this double-sided tape corresponds to the bottom part reinforcing film 13, and the adhesive layers of the double-sided tape correspond accordingly to the top part adhesive layer 12 and the bottom part adhesive layer 14. Also, for the double-sided tape, on the surface opposite to the side of the top part reinforcing film 11, the liner 15, is present. Manufacturing of the anti-slip sheet 1 is not limited to the above described method.

The above described manufacturing method provides a material that can be readily fixed through adhesion onto bathroom floors or bathtub bottoms, hand rails etc., locations around water. In addition, even on surface of hot spring stones or poolside concrete floors etc., locations that have protrusions and indentations this sheet can be fixed by adhesion after these have been coated using a primer, and the installation is easy. Moreover, if on this anti-slip sheet 1 a repeat release liner adhesive that has a strong adhesion is used in the case when due to the usage an exchange becomes necessary, it is possible to be easily removed as there is no adhesive remaining on the floor surface.

Then, in the case of this anti-slip sheet 1, it has a protrusion and indentation containing surface 10a where the "maximum value of the peak distance of the adjacent protruded parts" s 10 microns or higher and 150 microns or less, and also the "surface roughness maximum height Rmax" is 15 microns or higher and 90 microns or less, on its front surface, and it is provided with the Shore hardness A of 60 or higher and 80 or lower resin film 10, and because of that even if the front surface is under humid environment, it is possible to maintain an excellent friction coefficient, and it has an excellent slip resistance, which is effective relative to preventing falls. More specifically, in the case of this anti-slip sheet 1 even if the front surface is in a wet state, the anti-slip results are extremely high, and as it is shown according to the described here below Examples, it is possible to obtain a high value (for example, 0.75 and above) for the anti-slip value measured according to the JIS A 1509-12 CSR anti-slip specification value. Also, in the case of this anti-slip sheet 1, when measured according to the test specified in the JIS P 8417 coefficient of friction test method, under wet conditions static friction coefficient (static friction resistance coefficient) has a value of 1.2 or higher. Especially, in the case of this anti-slip sheet 1, the protrusions and indentations containing surface 10a is soft and smooth and because of that the skin irritation is low and it is excellent for the skin, and when it comes into contact with skin such as, barefoot skin etc., there is almost no feeling of pain generated.

In the case of this anti-slip sheet 1, it is provided with the top part reinforcing film 11 and the bottom part reinforcing film 13 and because of that it is possible to increase the sheet strength and together with that it is possible to be a material where the generation of coiling (curling) or separation, is difficult. In addition, because of the fact that the resin film 10 and the top part reinforcing film 11 are formed as one body through co-extrusion, even when the front surface of the resin film 10 experiences an elongation and shrinkage force in the side direction, compared to the case where the resin film 10 and the top part reinforcing film 11 are fixed through an adhesive layer, it is possible to strongly hold the resin film 10, and the curling of the anti-slip sheet 1 is difficult and it is possible to increase the difficulty of curling. Alternatively, regarding the resin film 10 and the top part reinforcing film 11, it is also a good option if without using a co-extrusion method, these are formed as one body by using, for example, the lamination method or other method.

In the case of this anti-slip sheet 1, the top part reinforcing film 11 and the bottom part reinforcing film 13 are fixed through the top part adhesive agent layer 12, and thus the force applied to the sheet can be partially absorbed by the viscous properties of the top part adhesive layer 12. Through this structure, the curing and the separation of the anti-slip sheet 1 becomes even more difficult.

Figure 2A:
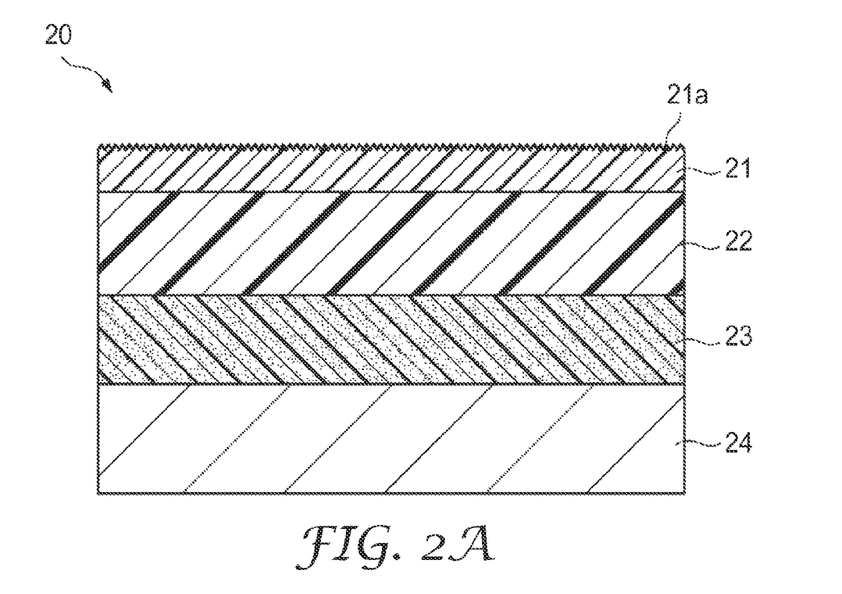
FIG. 2A is a cross sectional view of another embodiment of the anti-slip sheet to be used around water according to the present invention.
Figure 2B:
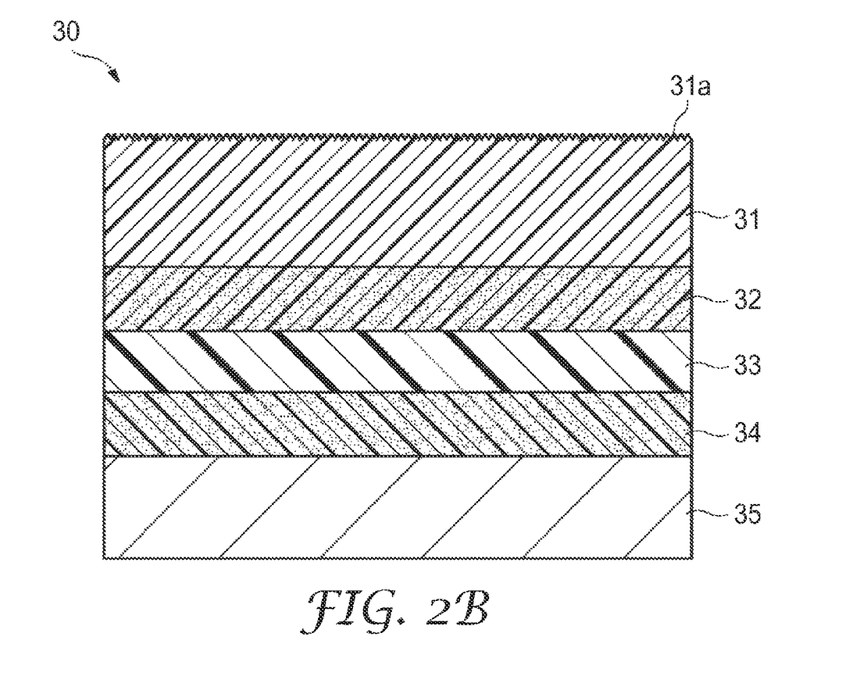
FIG. 2B is a cross sectional view of yet another embodiment of the anti-slip sheet to be used around water according to the present invention.

The present invention is not limited to the above described embodiments. In FIG. 2A, a sectional view diagram is shown of an anti-slip sheet 1 to be used around water according to another embodiment of the present invention. FIG. 2B is a sectional view diagram showing an anti-slip sheet 1 to be used around water according to another embodiment of the present invention.

Regarding the anti-slip sheet 20 shown in FIG. 2A compared to the anti-slip sheet 1 shown in FIG. 1, the difference is the point that it does not contain a top part adhesive layer and a bottom part reinforcing film. In the case of anti-slip sheet 20, it is provided with the resin film 21 containing a protrusion and indentation possessing surface 21a, a top part reinforcing film 22, a bottom part adhesive agent layer 23, and a liner 24. Regarding the resin film 21 and the top part reinforcing film 22, these are formed as one body through co-extrusion. The thickness of the bottom part adhesive layer 23 is within the range of 20 microns to 50 microns, and may be, for example, about 35 microns.

Regarding the shown in FIG. 2B, anti-slip sheet 30, compared to the anti-slip sheet 1 to be used around water shown in FIG. 1, the difference is the point that it does not contain a top part reinforcing film. In the case of this anti-slip sheet 30, it is provided with the resin film 31 containing a protrusion and indentation possessing surface 31a, a top part adhesive layer 32, a bottom part reinforcing layer 33, a bottom part adhesive layer 34 and a liner 35. For the embodiment shown in FIG. 2B, the anti-slip sheet 30 has a thickness of the resin film 31 within the range of 50 microns to 300 microns, and may be, for example, about 150 microns. The thickness of the bottom part reinforcing film 33 is within the range of 25 microns to 200 microns, and may be, for example about 50 microns. For the embodiment shown in FIG. 2B, the bottom part film 33 corresponds to the first reinforcing film according to the scope of the patent claims.

EXAMPLES

Here below, the anti-slip sheet to be used around water according to the present invention is described in further details based on practical implementation examples.

Example 1

For the anti-slip sheet to be used around water according to the Example 1, the structure shown in FIG. 1 was used. As the resin film 10 and the top part reinforcing film 11, a thermo-plastic urethane resin (ET880) available from the BASF company was used. As the bottom part reinforcing film 13, polyester film was used, and the top part adhesive layer 12 and the bottom part adhesive layer 14 acrylic type adhesive was used.

An explanation will be provided regarding the manufacturing method for the preparation of this anti-slip sheet to be used around water. First, for the resin film 10, a Shore hardness A 80 possessing resin was used, and for the top part reinforcing film 11, a Shore hardness A 90 possessing resin was used, and these resins were formed as one body through a two layer extrusion from T die using the co-extrusion method. The formation was conducted so that the thickness of the resin layer corresponding to the resin film 10 was 30 microns and the thickness of the resin layer corresponding to the top part reinforcing film 11 was 120 microns. Next, on the front surface of the resin layer corresponding to the resin film 10, by transferring the protrusions and indentations containing surface 10a from the engineering paper, which has been subjected to sand blasting, a transparent, matte film, was produced. The maximum value of the distance between the peaks of the adjacent top parts was 13.3 microns, the surface roughness maximum height Rmax was 18 microns. On the surface of the top part reinforcing film 11, a corona treatment was conducted as an adhesion facilitating treatment. Relative to this transparent matte film, Scotch #416 double-sided adhesive tape available from Sumitomo 3M was laminated, and by that the anti-slip sheet according to Example 1 was manufactured.

Example 2

In the case of the anti-slip sheet to be used around water according to Example 2, the structure shown in FIG. 2A was used. A sand blast processed paper was used so that protrusions and indentations were formed where the maximum value of the distance between the peaks of the adjacent top parts was 145.5 microns and the surface roughness maximum height Rmax was 82 microns, and the same way as in the case of the Example 1, a transparent matter film was manufactured. The surface of the side of the top part reinforcing film 22 of the transparent matter film was subjected to corona surface treatment, and an adhesive agent where BA/AA/Vac=90~95/3~6/2~4 was crosslinked by isocyanate, was coated on the surface of a release liner so that the thickness would become 35 microns and after drying, adhered, and by that the anti-slip sheet according to Example 2, was produced.

Example 3

In the case of the anti-slip sheet to be used around water according to Example 3, the structure shown in FIG. 2B was used. As the resin film 31, a thermo-plastic urethane resin (ET880) available from the BASF Company was used. On the surface of engineering paper, which has been sand blasted so that protrusions and indentations were formed where the maximum value of the distance between the peaks of the adjacent top parts was 23.5 microns and the surface roughness maximum height Rmax was 24 microns, a Shore hardness A 80 possessing, above described urethane resin was extruded as one layer by using the T die method and a 150 micron thickness, transparent matte film, was produced. Also, the surface of the side of the resin film 31 that is opposite to the protrusion and indentation containing surface 31a was subjected to corona surface treatment and the moisture index was made to be 62. Next, Scotch #416 double-sided adhesive tape available from Sumitomo 3M was laminated and by that the anti-slip sheet to be used around water according to Example 3 was produced.

Example 4

In the case of the anti-slip sheet to be used around water according to Example 4, the structure shown in FIG. 1 was used. For the anti-slip sheet to be used around water according to Example 4, the protrusions and indentations surface 10a had a maximum value of the distance between the peaks of the adjacent top parts of 66.6 microns, and the surface roughness maximum had a height Rmax of 82 microns. Everything else was the same as in the case of the Example 1.

Example 5

In the case of the anti-slip sheet to be used around water according to Example 5, the structure shown in FIG. 2B was used. For the anti-slip sheet according to Example 5, the protrusions and indentations surface 31a had a maximum value of the distance between the peaks of the adjacent top parts of 37.2 microns, and had a surface roughness maximum height Rmax of 82 microns. Everything else was the same as in the case of Example 1.

Reference Example 1

Figure 3A:
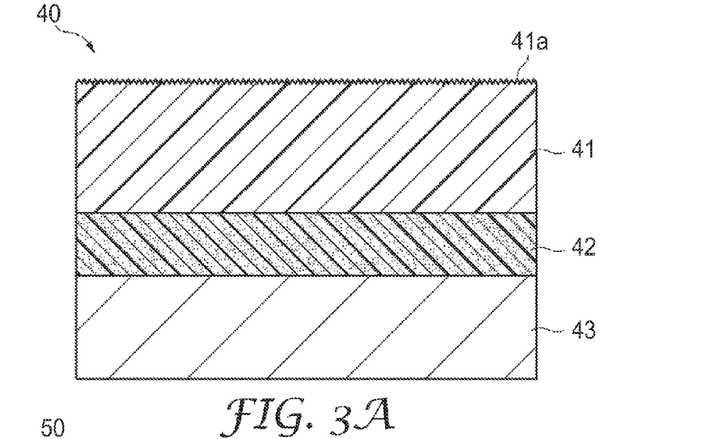
FIG. 3A is a cross sectional view of an anti-slip sheet to be used around water according to Reference Example 1.

In the case of the anti-slip sheet to be used around water according to the Reference Example 1, the structure shown in FIG. 3A was used. The shown in FIG. 3A anti-slip sheet 40 is provided with the resin film 41, which has the protrusions and indentations containing surface 41a as its front surface, the adhesive layer 42 and the liner 43. According to the Reference Example 1, as the resin film 41, a thermo-plastic olefin elastomer resin (ENGAGE 8200) available from the DuPont Dow Elastomer Company was used. According to the Reference Example 1, on the surface of an engineering paper, which has been sand blasted so that the maximum value of the distance between the peaks of the adjacent top parts was 21.4 microns and the surface roughness maximum height Rmax was 23.1 microns, a Shore hardness A 80 possessing, above described olefin elastomer resin was extruded as one layer by using the T die method and a 150 micron thickness, transparent matte film, was produced. The surface of the side of the resin film 41 that is opposite to the protrusion and indentation containing surface 41a was subjected to corona surface treatment and the moisture index was made to be 62. Next, relative to this surface, an adhesive where BA/AA/Vac=90~95/3~6/2~4 was crosslinked by isocyanate, coated on the surface of a release liner so that the thickness would become 35 microns and then drying, was adhered, and by that the anti-slip sheet according to the Reference Example 1 was produced.

Reference Example 2

Figure 3B:
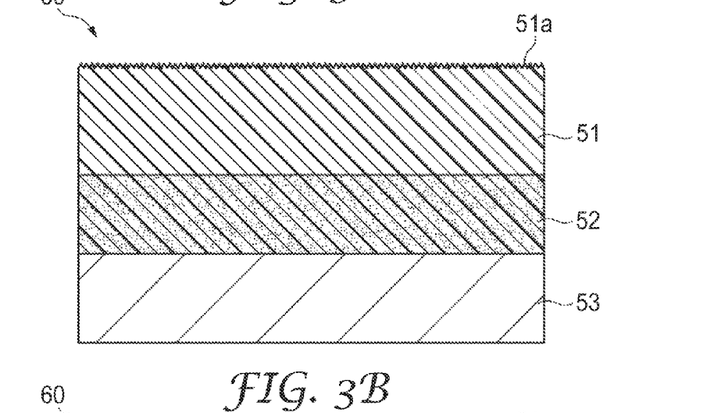
FIG. 3B is a cross sectional view of anti-slip sheets to be used around water according to Reference Examples 2 to 4.

For the anti-slip sheet to be used around water according to the Reference Example 2, the structure shown in FIG. 3B was used. In the embodiment shown in FIG. 3B, the anti-slip 50 is provided with the resin film 51, which has the protrusions and indentations containing surface 51a as its front surface, an adhesive layer 52 and a liner 53. For the resin film 51, thermo-plastic urethane resin (ET880) available from the BASF company having a Shore hardness A of 90 was used. The point that the maximum value of the distance between the peaks of the adjacent top parts was 44.4 microns and the surface roughness maximum height Rmax was 17.2 microns, and the point that the thickness of the adhesive agent layer 52 was made to be 35 microns. Everything else was the same as in the case of the Reference Example 1.

Reference Example 3

For the anti-slip sheet to be used around water according to the Reference Example 3, the structure shown in FIG. 3B was used. For the resin film 51 thermo-plastic urethane resin (ET880) available from the BASF company having a Shore hardness A 90 was used, the point that the maximum value of the distance between the peaks of the adjacent top parts was 44.4 microns and the surface roughness maximum height Rmax was 17.2 microns. Everything else was the same as in the case of the Reference Example 2.

Reference Example 4

In the case of the anti-slip sheet to be used around water according to the Reference Example 4, the structure shown in FIG. 3B was used. For the anti-slip sheet according to the Reference Example 4, the protrusions and indentations surface 51a maximum value of the distance between the peaks of the adjacent top parts was 35.0 microns and the surface roughness maximum height Rmax was 5.44 microns. Everything else was the same as in the case of the Reference Example 2.

Reference Example 5

Figure 3C:
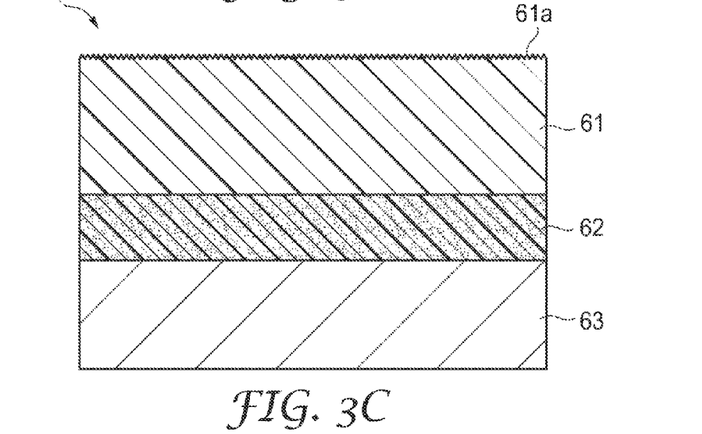
FIG. 3C is a cross sectional view of an anti-slip sheet to be used around water according to Reference Example 5.

For the anti-slip sheet to be used around water according to the Reference Example 5, the structure shown in FIG. 3C was used. In the embodiment shown in FIG. 3C, the anti-slip sheet 60 was provided with the resin film 61, which has the protrusions and indentations containing surface 61a as its front surface, the adhesive layer 62 and the liner 63. In the case of the anti-slip sheet according to the Reference Example 5, the resin film 51 was formed of a material having a Shore hardness A 85 possessing, soft transparent polyurethane, the point that the protrusions and indentations containing surface 61a, the maximum value of the distance between the peaks of the adjacent top parts was 4.5 microns and the surface roughness maximum height Rmax was 3.7 microns. Everything else was the same as in the case of the Reference Example 1.

Reference Example 6

Figure 4A:
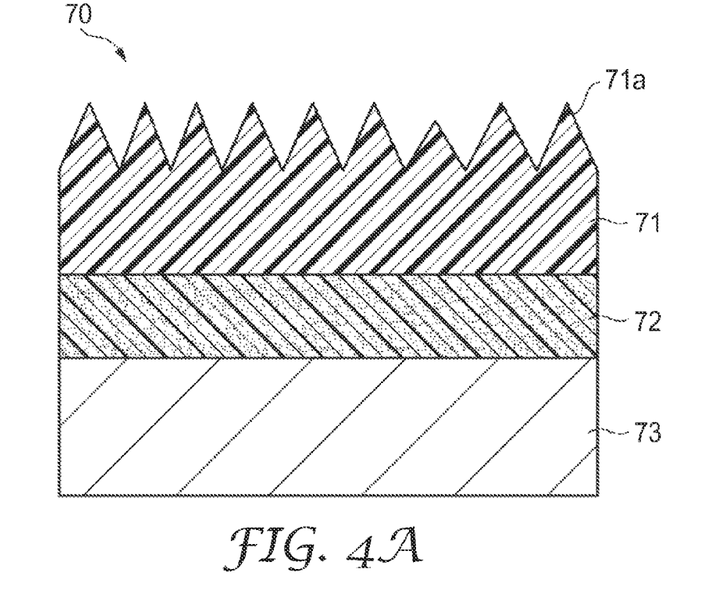
FIG. 4A is a cross sectional view of an anti-slip sheet to be used around water according to the Reference Example 6.

In the case of the anti-slip sheet to be used around water according to the Reference Example 6, the structure shown in FIG. 4A was used. In the embodiment shown in FIG. 4A, anti-slip sheet 70 was provided with the resin film 71, which has the protrusions and indentations containing surface 71a as its front surface, the adhesive layer 72 and the liner 73. The anti-slip sheet to be used around water according to the Reference Example 6 was the 3M™ bus tab SafetyWalk™ D type.

Reference Example 7

Figure 4B:
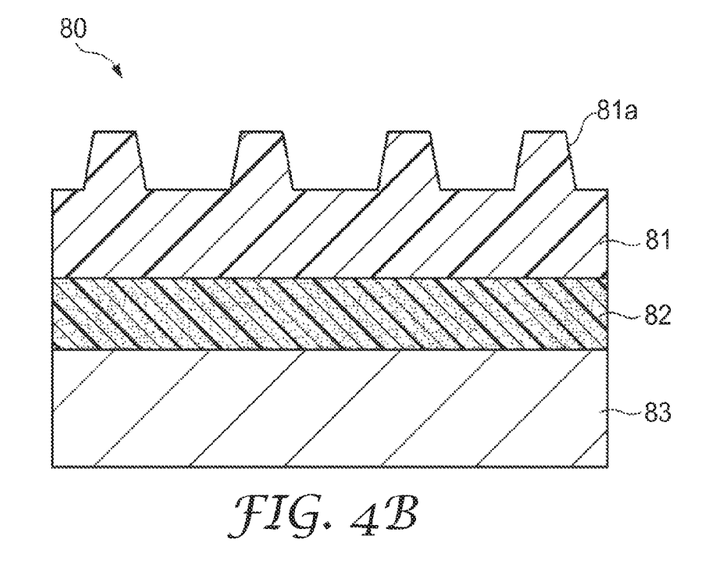
FIG. 4B is a cross sectional view of an anti-slip sheet to be used around water according to the Reference Example 7.

In the case of the anti-slip sheet to be used around water according to the Reference Example 7, the structure shown in FIG. 4B was used. In the embodiment shown in FIG. 4B anti-slip sheet 80 is provided with the resin film 81, which has the protrusions and indentations containing surface 81a as its front surface, the adhesive layer 82 and the liner 83. The anti-slip sheet according to the Reference Example 7 is an olefin elastomer emboss processed adhesive tape where protrusion and indentations with a height of 1 mm have been imparted.

Test Methods

Testing of the Barefoot Anti-Slip Properties Under Wet Conditions

The testing of the anti-slip properties was conducted according to the method specified in the JIS A 1509-12. Also, regarding the water wetting state, 4 weight parts of the powder material 1 used for the testing according to the JIS Z 8901 were mixed with 300 times water and coated so that the weight per surface area would become 400 g/m2, and by that the soiling of the back of the bare feet at the practical time, was reproduced. The measurement results are shown in Table 1 as CSR B specification value.

Static Friction Resistance Coefficient Measurement Test

According to the method specified in the HS P 8417, the static friction coefficient of the surface of the anti-slip sheet to be used around water was measured. The test piece was produced as the anti-slip sheet was adhered onto a stainless steel plate. The rate was 1 m/min, the load was 1 kg, and for the contact surface the artificial skin surface was used (manufactured by Shikishima Leather Co., Steer Smooth), and a 6 cm×6 cm test surface area was measured. Also, the testing was conducted in both dry conditions and humid conditions. The measurement results are shown in Table 1.

Figure 5:
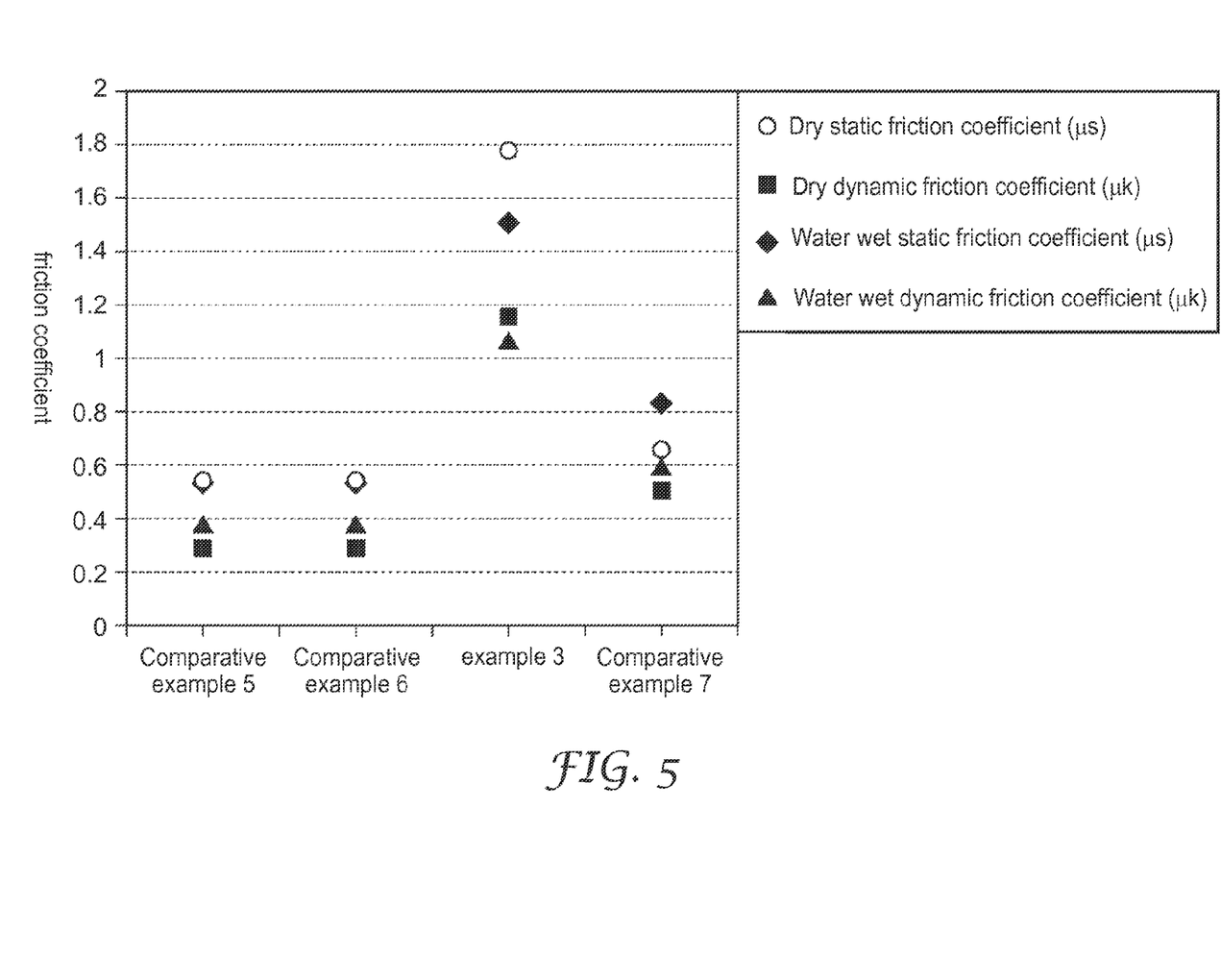
FIG. 5 is a graph showing the measurement results from the static friction coefficient in the case of the Example 3 and the Reference Examples 5 to 7.

Also, the measurement results for Example 3 and the Reference Examples 5 through 7 are shown as a graph in FIG. 5.

Measurement of the Surface Roughness

The surface roughness was measured by using a non-contact surface roughness measurement device (the NewView 6000 device manufactured by Zygo). The magnification used was made to be 20 times and the maximum value of the distance between the peaks of the adjacent top parts and the surface roughness maximum height Rmax were measured. The measurement results are shown in Table 1.

Adhesive Force (Strength) Measurement

The JIS 023 standard was used and the interlayer adhesive strength between each film and adhesive agent layer was measured.

Test of Curling Performance

Figure 6:
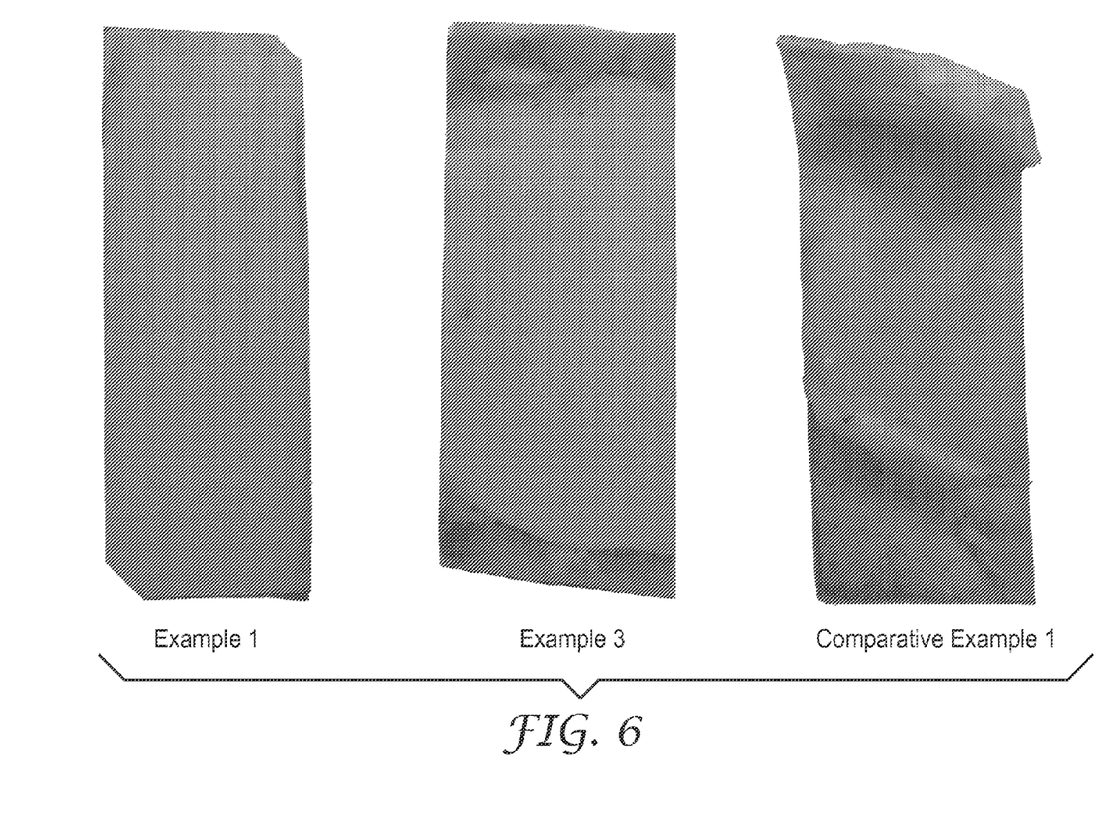
FIG. 6 includes photographs showing the test results from the curling performance in the case of the Example 1, Example 3 and the Reference Example 1.

The anti-slip sheet was cut and 25 mm×50 mm test pieces were produced. The test pieces were adhered to a concrete floor that had been coated with a water-resistant epoxy coating material. After a period of 48 hours, the edge part curl was measured as safety shoes with rubber soles and with a load of 10 kgs were passed back and forth 100 times horizontally on the surface. The measurement results are shown in Table 1. In Table 1, measurement results "E" correspond to the conditions shown in FIG. 6, Example 1, measurement results "M" correspond to the conditions shown in FIG. 6, Example 3, and measurement results "B" correspond to the conditions shown in FIG. 6, Reference Example 1.

Surface Pain Test

The anti-slip sheet was cut to a length of 800 mm×width of 20 mm, and these were adhered onto a bathtub floor at a distance of 20 mm. In this condition, standard adult male and female subjects were used and their buttocks part was placed on the sheet and they slid back and forth and the pain felt at the skin of the buttocks parts "surface pain" was evaluated.

What is claimed is:

1. Anti-slip sheet to be used around water, which has
   a resin film that has a Shore A hardness that is 60 or higher and 82 or lower,
   and that has a protrusion and indentation surface where the maximum distance between adjacent protrusions is within the range of 10 microns to 150 microns,
   and also, which has a maximum height Rmax of the surface roughness is within the range of 15 microns or higher and 90 microns or lower,
   a first reinforcing film positioned on the resin film on the side opposite to the protrusions and indentations containing surface, wherein the first reinforcing film is harder than the resin film, and
   an adhesive agent layer positioned on the side of the first reinforcing film that is opposite to the resin film
   wherein a second reinforcing film is provided in the space between the first reinforcing film and the adhesive agent layer, and wherein the second reinforcing film is harder than the resin film.

2. The sheet of claim 1, wherein the first reinforcing film is an elastomer that has a Shore hardness A of at least 90 or higher.

3. The sheet of claim 1, where the thickness of the whole body of the sheet is 500 microns or less.

4. The sheet of claim 1, where the resin film and the first reinforcing film are both urethane elastomers.

5. The sheet of claim 4, where the resin film and the first reinforcing film are formed as one body through a co-extrusion method.

6. The sheet of claim 1, where the second reinforcing film is a polyester film.

7. Anti-slip sheet to be used around water, which has
   a resin film that has a Shore A hardness that is 60 or higher and 82 or lower,
   and that has a protrusion and indentation surface where the maximum distance between adjacent protrusions is within the range of 10 microns to 150 microns,

TABLE 1

|  | E1 | E2 | E3 | E4 | E5 | RE1 | RE2 | RE3 | RE4 | RE5 | RE6 | RE7 |
|---|---|---|---|---|---|---|---|---|---|---|---|---|
| 1. Static friction coefficient (dry) | 1.8 | 1.5 | 1.8 | 1.8 | 1.8 | 0.7 | 1 | 1.2 | 1.8 | 0.62 | 0.55 | 0.8 |
| 2. Static friction coefficient (wet) | 1.5 | 1.2 | 1.5 | 1.5 | 1.5 | 0.5 | 0.7 | 0.7 | 1.5 | 0.35 | 0.29 | 0.6 |
| 3. Curl performance | E | G | M | E | M | VB | B | B | B | M | E | G |
| 4. Surface roughness (peak distance maximum value) | 13.5μ | 145.5μ | 23.5μ | 66.6μ | 37.2μ | 21.4μ | 44.4μ | 35.0μ | 25.4μ | 4.5μ | 1500μ | 1000μ |
| 5. Surface roughness (maximum height (Rmax)) | 18μ | 20μ | 24μ | 82μ | 82μ | 23.1μ | 17.2μ | 5.44μ | 19μ | 3.7μ | 1500μ | 500μ |
| 6. Anti-slip properties (CSR B) | E (0.84) | G (0.75) | E (0.85) | E (0.93) | E (0.95) | E (0.94) | G (0.77) | B (0.50) | E (0.83) | B (0.39) | E (1.20) | E (1.08) |
| 7. Resin film hardness e | 80 | 80 | 80 | 79 | 80 | 80 | 80 | 90 | 80 | 85 | 80 | 90 |
| 8. Top part reinforcing film hardness e | 90 | 90 | — | 90 | — | — | — | — | — | — | — | — |
| 9. Adhesive force (strength) (N/25 mm) | 20 | 18 | 20 | 20 | 20 | 15 | 15 | 15 | 15 | 15 | 25 | 20 |
| 10. Surface pain | E | E | E | G | G | E | E | G | E | G | VB | B |
| 11. Interlayer adhesion (N/25 mm) | 35 | 25 | 20 | 35 | 20 | 5 | 15 | 15 | 15 | 15 | 25 | 18 |
| 12. Structure (Figure No.) | 1 | 2A | 2B | 1 | 2B | 3A | 3B | 3B | 3B | 3C | 4A | 4B |

E1-E5 = Examples 1-5
RE1-RE7 = Reference Examples 1-7
E = Excellent
G = Good
M = Medium
B = Bad
VB = Very Bad and also, which has a maximum height Rmax of the surface roughness is within the range of 15 microns or higher and 90 microns or lower, a first reinforcing film positioned on the resin film on the side opposite to the protrusions and indentations containing surface, wherein the first reinforcing film is harder than the resin film, and an adhesive agent layer positioned on the side of the first reinforcing film that is opposite to the resin film, wherein the thickness of the whole body of the sheet is 500 microns or less.

8. The sheet of claim 7, where the first reinforcing film is an elastomer that has a Shore hardness A of at least 90 or higher.

9. The sheet of claim 7, wherein a second reinforcing film which is harder than the resin film is provided in the space between the first reinforcing film and the adhesive agent layer.

10. The sheet of claim 9, where the above described second reinforcing film is a polyester film.

11. The sheet of claim 7, where the resin film and the first reinforcing film are both urethane elastomers.

12. The sheet of claim 11, where the resin film and the above first reinforcing film are formed as one body through a co-extrusion method.

* * * * *

UNITED STATES PATENT AND TRADEMARK OFFICE
CERTIFICATE OF CORRECTION

PATENT NO. : 10,040,268 B2  
APPLICATION NO. : 14/904851  
DATED : August 7, 2018  
INVENTOR(S) : Makoto Sasaki et al.

Page 1 of 1

It is certified that error appears in the above-identified patent and that said Letters Patent is hereby corrected as shown below:

In the Specification

Column 12
Line 58, Delete "HS" and insert -- JIS --, therefor.

Signed and Sealed this
Fifth Day of March, 2019

Andrei Iancu
*Director of the United States Patent and Trademark Office*